United States Patent
Black et al.

[19]

[11] Patent Number: 6,126,307

[45] Date of Patent: Oct. 3, 2000

[54] METHOD AND APPARATUS FOR MIXING CONCRETE WITH CONTROLLED ENERGY ABSORPTION AND VARIABLE DISCHARGE GATE

[76] Inventors: Melvin L. Black; Todd W. Black, both of 610 Big Bend Dr., Pacifica, Calif. 94044

[21] Appl. No.: 09/080,545

[22] Filed: May 18, 1998

Related U.S. Application Data

[63] Continuation of application No. 08/404,048, Mar. 14, 1995, abandoned.

[51] Int. Cl.[7] .................................. B28C 7/02; B28C 7/16
[52] U.S. Cl. ............................... 366/43; 366/65; 366/192
[58] Field of Search ................................ 366/16–20, 30, 366/33, 34, 35, 37, 38, 43, 64–66, 156.1, 156.2, 192, 601

[56] References Cited

U.S. PATENT DOCUMENTS

| | | |
|---|---|---|
| 3,306,589 | 2/1967 | Uden . |
| 3,395,834 | 8/1968 | Troy . |
| 3,596,759 | 8/1971 | King et al. . |
| 3,695,427 | 10/1972 | Friesz . |
| 3,886,063 | 5/1975 | Friesz . |
| 3,905,586 | 9/1975 | Wall, Jr. . |
| 3,986,708 | 10/1976 | Heltzel et al. . |
| 3,997,434 | 12/1976 | Macauley, Jr. . |
| 4,002,891 | 1/1977 | Porter ........................................ 366/601 |
| 4,091,463 | 5/1978 | Tschudy et al. . |
| 4,127,478 | 11/1978 | Miller . |
| 4,204,773 | 5/1980 | Bates . |
| 4,207,176 | 6/1980 | Hood . |
| 4,225,357 | 9/1980 | Hodson . |
| 4,226,542 | 10/1980 | Black et al. . |
| 4,285,808 | 8/1981 | Horton . |
| 4,298,288 | 11/1981 | Weisbrod . |
| 4,395,128 | 7/1983 | Mathis et al. . |
| 4,435,081 | 3/1984 | Del Fabbro . |
| 4,624,575 | 11/1986 | Lantz . |
| 4,865,457 | 9/1989 | Strehlow . |
| 5,149,192 | 9/1992 | Hamm et al. . |
| 5,186,840 | 2/1993 | Christy et al. . |
| 5,213,414 | 5/1993 | Richard et al. ...................... 366/156.2 |
| 5,433,521 | 7/1995 | Inoue et al. . |
| 5,718,508 | 2/1998 | Williams ................................... 366/64 |

FOREIGN PATENT DOCUMENTS

| | | |
|---|---|---|
| 646885 | 8/1964 | Belgium . |
| 2650617 | 2/1991 | France . |
| 3307977 | 9/1984 | Germany . |
| 922095 | 4/1982 | U.S.S.R. . |
| 1615167 | 12/1990 | U.S.S.R. . |
| 1104827 | 2/1968 | United Kingdom . |
| 2147215 | 5/1985 | United Kingdom . |

OTHER PUBLICATIONS

Bob Ober, "Traditional uses blur as mixing bcomes a science", Aberdeen's Concrete Journal & Trader, The Abderdeen Group, Aug. 1993.

Various Product Brochures of Concrete Mixers and Plants, dates unknown.

"How Does the Autocon Mixer Work?" Specification Sheet for the Autocon Continuous Mixers, Product Brochure for Autocon Continuous Mixers, St. Helena, CA, date unknown.

"Cost Saving Analysis NIKKO Spiral Flow, Twin Shaft Concrete Mixing System A Typical North American Dry Batch Concrete System", re comparison data from Lakeside Sand and Gravel, date unknown.

*Primary Examiner*—Charles E. Cooley
*Attorney, Agent, or Firm*—Beyer & Weaver, LLP

[57] ABSTRACT

An apparatus for making concrete is disclosed. The apparatus includes one or more measurement devices that is used to provide controlled quantities of at least cement and sand; a high intensity mixer that receives the controlled quantities of the cement and sand, mixes the controlled quantities of the cement and sand to produce grout, and outputs a flow of grout; and a controller coupled to the measurement devices and the mixer. The controller monitors and controls mixing energy applied by the mixer during mixing. In one embodiment, the mixing energy is altered by controlling the degree of opening of a discharge gate of the mixer. A concrete plant design including such an apparatus is also disclosed.

21 Claims, 6 Drawing Sheets

METHOD AND APPARATUS FOR MIXING CONCRETE WITH CONTROLLED ENERGY ABSORPTION AND VARIABLE DISCHARGE GATE

This is a Continuation application of prior application Ser. No. 08/404,048 filed on Mar. 14, 1995, now abandoned.

FIELD OF THE INVENTION

This invention relates to making concrete with higher strength, less pollution, and less energy consumption than traditional methods and apparatuses.

BACKGROUND OF THE INVENTION

The traditional way to make concrete in ready mix plants is to place sand, gravel and cement in separate hoppers feeding a drum or mixer which discharges into a concrete truck having a rotating drum to further mix en route to the job site where the cement is poured into the desired location, where it solidifies into concrete. Because the physical characteristics of each of the ingredients varies so much, traditional plants use powerful motors to mix, and the motors waste energy, and are inefficient. Typically, a batch will be twelve cubic yards of material premixed at the plant without water, and then placed in the concrete truck for further mixing by tumbling.

The prior art cement plants often do not have uniform mixing because of the large batch size and the differences in particle size among cement, fly ash, sand and aggregate. Water, if it is present, does not facilitate mixing, and sometimes hinders mixing when ingredients have hydrophobic surfaces. Also, the stiffness of the concrete affects the mixing characteristics. That is, high strength concrete has greater stiffness than low strength concrete, and the higher the strength, the more difficult it is to get complete mixing.

The strength of the concrete is measured by a variety of techniques, one of them is "slump," an analog of the strength of the concrete. Slump is determined by taking a cone-shaped receptacle filled with mixed, but not set, concrete 16 inches deep, turning the receptacle upside down on a horizontal surface, and releasing the cone. As the cone slumps when unsupported by the receptacle, it indicates the stiffness of the concrete. A slump of four inches, for example, indicates a relatively weak concrete, while a slump of one inch indicates a relatively strong concrete. The strongest concrete has zero slump. It will be apparent that a concrete that does not slump does not mix as readily as one that inherently oozes around the ingredients to achieve better mixing.

If there is inadequate mixing, there are pockets of unmixed materials that will be either voids or non-adhering particles. As a chain is only as strong as its weakest link, so too concrete is only as strong as the average strength of the set product. This has led designers of sky-scrapers, for example, to demand higher strength than would otherwise be called for in order to be sure the average strength meets the requirements. This overengineering leads to unnecessary costs that could be avoided by thorough mixing.

The desire for adequate mixing is also reflected in the mixing cycles. If a plant normally has a 60 second mixing cycle for a 12 yard batch, the operator will run the plant at 60 seconds even with a 8 yard batch, just to be sure the mixing is adequate. This means that the throughput of the plant is reduced with different sized batches. The result is a waste of energy and time.

Yet another mixing problem is that the size of aggregate varies widely, from about 3/16 inch to 1 and ½ inches. A great deal more energy is needed to mix large rock in making concrete, so plants are designed for the maximum energy requirements, even though those requirements are rarely needed.

In recent years, cement plants have used high intensity mixers, having two motors on the order of 100 horsepower each, to more thoroughly mix sand, cement, gravel and water before discharge into the concrete truck. Fly ash, a by-product of other industrial processes, is cheap and abundant, and may be substituted for up to 20% of the cement used in the typical ready mix plant. The motors are driven at peak power for a few seconds to charge the mixer with six cubic yards of ingredients, but the power is to some extent wasted, because the high energy consumption does not result in thorough mixing at the time of charging. After the first six yards are mixed and emptied from the mixer a second six yard batch is charged into the mixer. The motors are again driven at peak power to mix the second half of the 12 yard load on the truck. Again, the power is not optimally used.

Moreover, the high intensity mixers are practically limited to low strength concrete in transit mix operations, because the time needed to move stiff "low slump" concrete out of the premixer and into the truck is not compatible with the normal cycle times of the premixer. There is a bridging effect with low slump concrete in the truck, whereby the stiff concrete piles up and forms voids, with the result that the truck cannot hold a full load unless the concrete is added more slowly than usual. The capacity of the plant having high intensity mixers is reduced when high strength concrete is shipped.

SUMMARY OF THE INVENTION

According to the present invention, precise metering of water, sand and cement into a mixer by using a computerized variable speed controller for each ingredient allows the formation of a grout of optimum texture, uniformity and quality. The grout is continuously prepared in a small batch discharge mixer with a relatively low power motor. By controlling the rate of batch discharge, mixer horsepower and mix time, a uniformly mixed grout continuously emerges from the mixer to be blended with gravel at the entrance to the truck drum. Only gravel and the uniform grout are mixed in the truck en route to the jobsite, a task well suited to the rotating truck drum.

A low horsepower motor may be used because there is no peak charging such as in prior art mixers, the heavy gravel is not in the grout, and the dwell time in the small mixer provides an effective horsepower far greater than any mixer currently in use. An increase in residence time in the mixer allows the grout to absorb much more energy than in conventional systems or in high intensity systems.

The present invention utilizes approximately half the total horsepower of the conventional wet mix plant, and is considerably less costly to purchase, ship, install and maintain than other ready mix concrete plants. The apparatus of the present invention can process 12 yards of pre-mix grout, and can force charge the mixer truck at velocities up to 800 feet per minute. It is usable with all ranges of slumps and partial batches may be mixed without sacrificing plant production or efficiency.

The preferred embodiment is to mix a grout of separately weighed water, sand and cement, with or without separately weighed fly ash, and combine aggregate and grout at the discharge of the mixer, so that grout and aggregate are mixed in the truck. However, the advantages of the invention may still be realized to some extent by mixing separately weighed rock in the mixer with the other ingredients. Likewise, sand, cement and flash may be mixed dry, relying only on adsorbed moisture on the sand to suppress dust, while adding water at the discharge from the mixer.

The large, expensive, and high maintenance dust control systems of conventional ready mix plants may be avoided because the air displacement of the small batch discharge mixer is so much less than the air displacement of full batch size mixers that it only requires a dust collector a small fraction of the size of the conventional plant.

DESCRIPTION OF THE PREFERRED EMBODIMENTS

Figure 1:
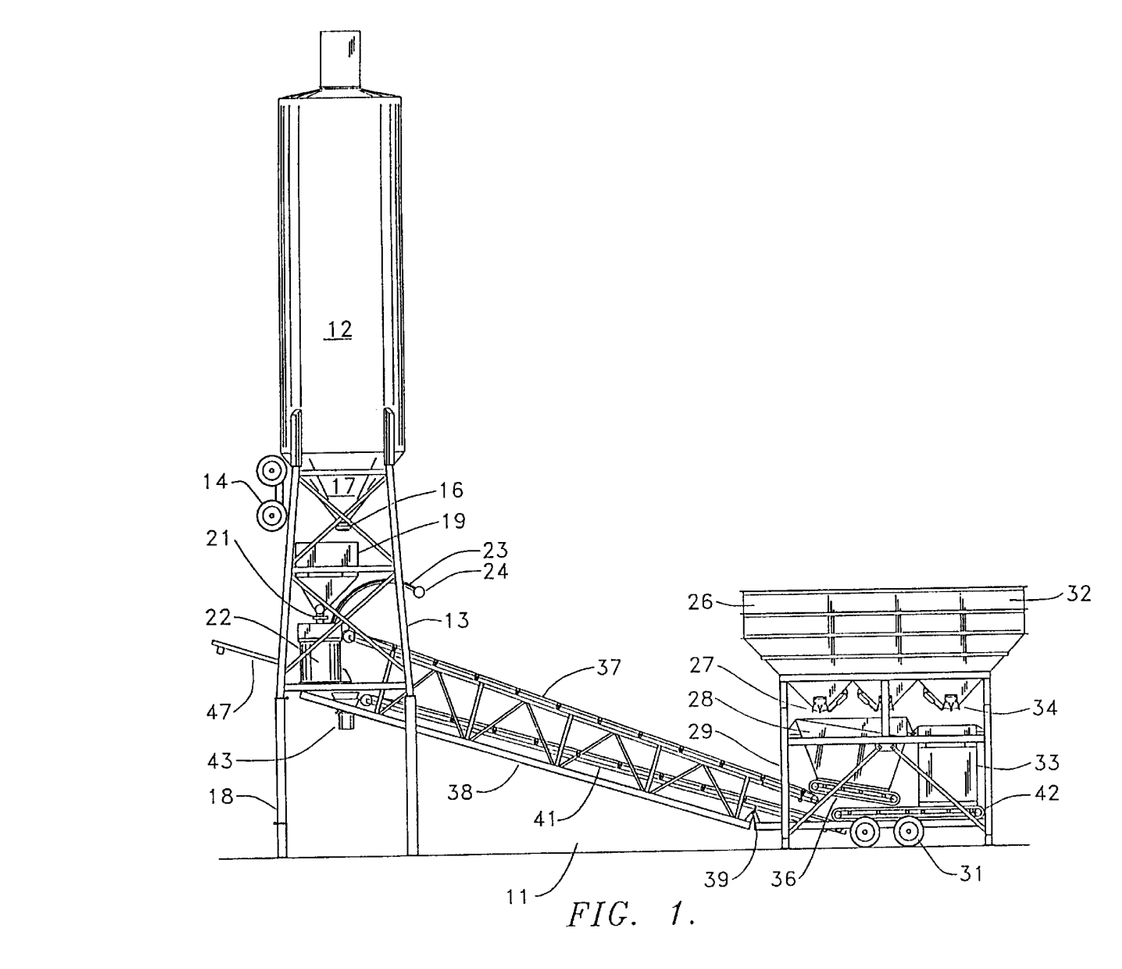
FIG. 1 is an elevation view of an assembled portable concrete plant according to the present invention.

While a portable plant is described here, it should be understood that fixed plants are also contemplated by this invention. Referring to FIG. 1, concrete plant 11 includes a cement storage container 12, which, if desired, may be divided into two or more compartments (not shown) for separately storing cement and fly ash, for example. Cement storage 12 is permanently attached to a stand 13 having three or more legs to support the container 12 in an upright manner during use.

Figure 2:
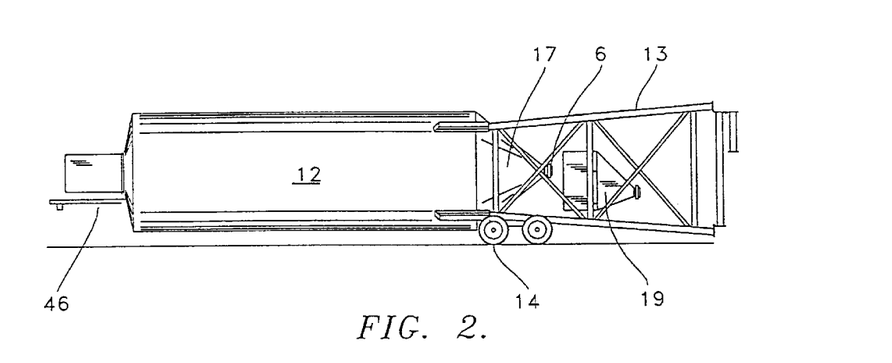
FIG. 2 is a side view of the towable assembly for the cement storage and hopper.

Container 12 and stand 13 may be towed to a jobsite by means of wheels 14, affixed to stand 13 at a location to provide suitable balance when in the towing position shown in FIG. 2. Container 12 has an egress 16 at the apex of conical portion 17 of container 12.

In operation, container 12 and stand 13 are turned upright in the manner shown in FIG. 1 and attached to mount 18, which consists of four vertical members corresponding to the four legs of stand 13 in the embodiment shown. Mount 18 is designed to accommodate concrete trucks (not shown) underneath container 12 and stand 13. Typically mount 18 has a 13 foot vertical clearance to permit top loading of trucks. The total height of container 12, stand 13 and mount 18 may conveniently be 73 feet in the assembled plant.

Egress 16 of container 12 allows gravity feed of cement or other contents of container 12 to cement weigh hopper 19, which measures a desired amount of cement by weight. When the predetermined amount of cement enters hopper 19, egress 16 automatically closes. Precise metering of all ingredients in the mixing process is controlled by computer (not shown).

At the bottom of hopper 19 is a meter 21 for dispensing the desired amount of cement into mixer 22. Water from an external source enters mixer 22 through pipe 23.

Metering valve 24, controlled by the computer (not shown), allows precisely the amount of water for the desired grout mixture. Alternatively, a scale may be used to weigh the required amount of water, pursuant to signal from the computer.

The third ingredient in the grout is sand, which is stored in bin 26 having a closable egress 27 for gravity feeding weigh hopper 28. Sand bin 26 and weigh hopper 28 are mounted on a stand 29, which in turn is secured to wheels 31 for portability.

Also mounted on stand 29 is rock bin 32, positioned above rock weigh hopper 33 to allow gravity feed of gravel to hopper 33 through closable egress 34.

Only sand and cement are introduced into the mixer 22; rock is entered into the drum of the concrete truck along with grout from the mixer 22. Sand from bin 26 drops to weigh hopper 28. The sand from hopper 28 falls on short sand conveyor 36, which has a variable speed drive controlled by the computer (not shown) and passes to long sand conveyor 37, to precisely introduce sand to the mixer along with cement and water. Long sand conveyor 37 is carried on boom 38, which is movable between the operating position shown in FIG. 1 and the stowed position of FIG. 3 by means of hinge 39.

Also carried on boom 38 is long rock conveyor 41, which is fed rock from short rock conveyor 42. Rock from bin 32 passes to hopper 33, and then to short conveyor 42. Conveyor 42 also has a variable speed drive. Rock proceeds to long conveyor 41 which dispenses it into truck load hopper 43. After the grout has been thoroughly mixed in mixer 22, a concrete truck (not shown) is driven underneath stand 13, grout from mixer 22 is fed to hopper 43 along with rock from long conveyor 41. Hopper 43 directly passes the rock and grout into the drum of the concrete truck.

Referring to FIG. 2, the plant 11 of FIG. 1 has been disassembled into two portable parts, one of which is shown in FIG. 2. Container 12 and stand 13, which also carries hopper 19, are tipped horizontally and balanced on wheels 14. A towbar 46 is mounted on container 12 to permit the whole assembly to be towed to or from a jobsite.

Figure 3:
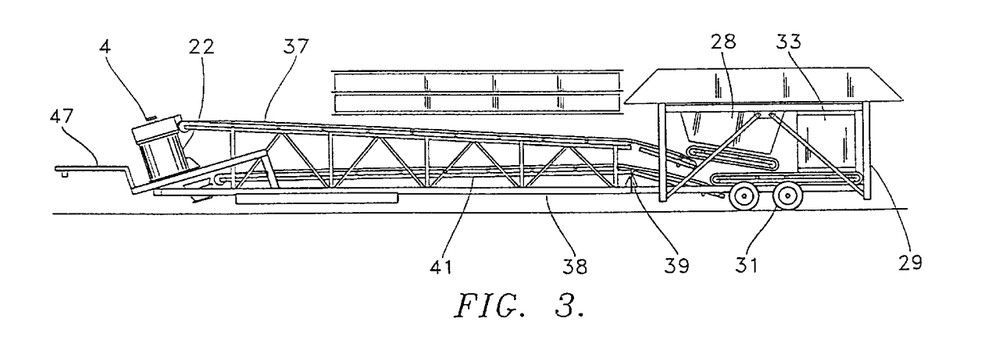
FIG. 3 is a side view of the towable assembly of conveyors, sand and gravel hoppers and mixer.

FIG. 3 shows the remaining parts of the plant, including mixer 22, boom 38, conveyors 37 and 41, and hoppers 33 and 28. Towbar 47 serves to permit the assembly to be towed while balanced on wheels 31.

Figure 4:
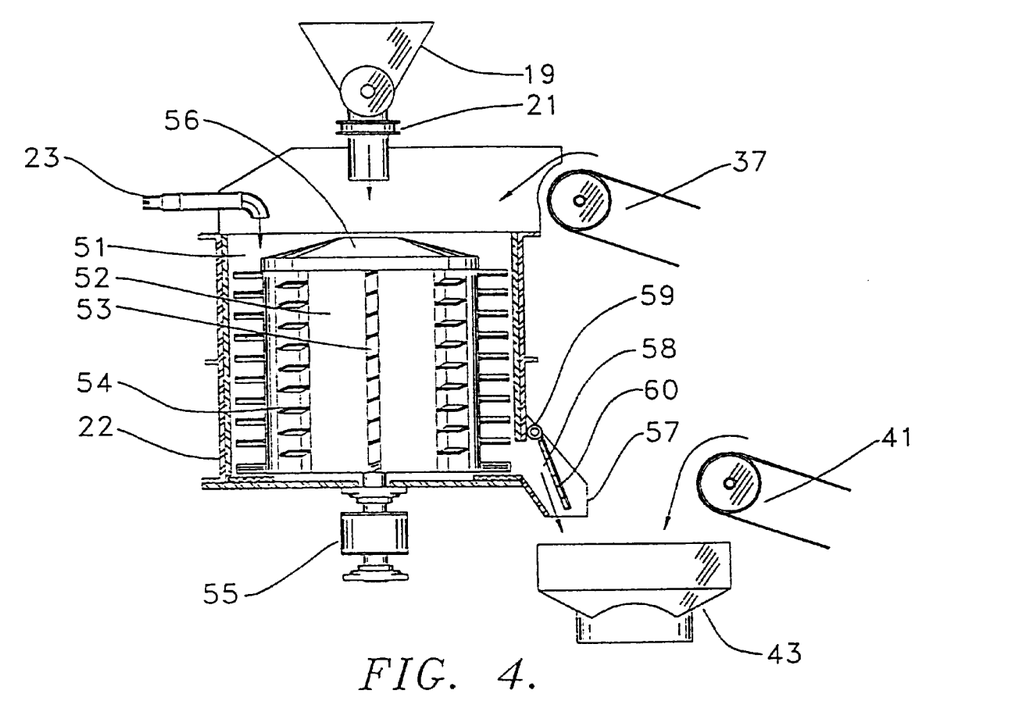
FIG. 4 is a cross-sectional view of the high intensity mixer.

FIG. 4 shows a cross-section of the mixer. It is a vertically oriented continuous mixer that provides high intensity mixing. The mixer may have a capacity from 0.25 yard to 2 cubic yards. The preferred mixer has a capacity of 0.72 cubic yard. A mixer less than ¾ yard is a vast distinction over the prior art. Mixer 22 receives metered water from line 23, cement from hopper 19 through meter 21, and sand from conveyor 37, all automatically controlled by computer to introduce the precise quantities needed by variable speed sources.

Inside mixer 22 there is a mixing chamber 51 within which a mixing head 52 rotates about a vertical shaft 53. On the periphery of the mixing head are a multiplicity of short blades 54 extending into the mixing chamber 51. A satisfactory array of blades 54 is ten vertical lines of blades around mixing head 52, with ten blades per vertical line. Shaft 51 may be rotated at a speed variable between 100 and 1200 RPM drum by motor 55. The clearance between the blade tips and the inside wall of chamber 51 may conveniently be between 0.125 and 0.010 inches. Mixing head 52 has a cap 56 which serves to direct incoming materials to chamber 51 for mixing by means of blades 54.

Because this mixer 22 is much smaller than prior art batch size mixers, longer wear materials may be used without the cost of the plant being prohibitive. Thus, blades 54 are preferably made of hardened D2 steel. Lining 61 is preferably made of ceramic such as aluminum oxide. The lower deck of mixer 22, onto which the mixed ingredients fall during mixing and before discharge, is preferably coated with tungsten carbide. When the grout has been thoroughly mixed, it is discharged through chute 57 into truck load hopper 43. The horsepower absorbed during mixing is controlled by means of a discharge gate 58, which is mounted on mixer 22 by hinge means 59. Gate 58 may be controlled by the computer (not shown) signaling air cylinder 60 to open or close the gate to allow more or less back pressure against the flow of grout through the mixer. Alternatively, gate 58 may be manually controlled to select the optimum horsepower absorbed by the mixture in mixer 22.

Figure 5:
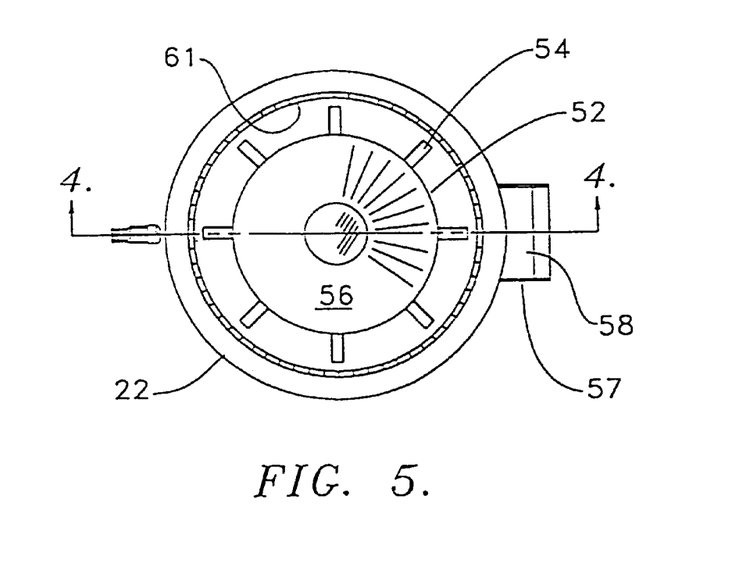
FIG. 5 is a top view of the mixer.

FIG. 5 is a top view of mixer 22, showing the mixing head 52, cap 56, and blades 54. Discharge chute 57 and gate 58 are also shown.

Figure 6:
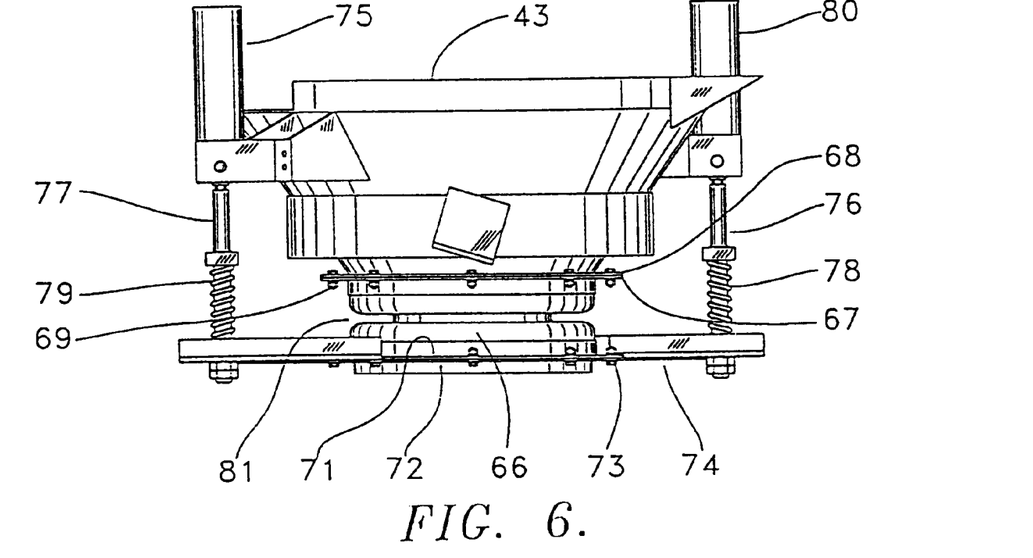
FIG. 6 is a drive through attachment for the discharge of the mixer, shown in the retracted or stowed position.

FIG. 6 is an attachment to the discharge end of the mixer to minimize dripping of concrete on the windshield and front of the truck. While most conventional wet mix plants are designed to allow the concrete truck to drive through the support for the discharge chute, in practice, most drivers do not drive through because the dregs of the last load tend to drip down onto the hood and windshield of the truck as it enters the loading zone. In order to keep the truck clean, most drivers drive around the loading zone and back the truck into a position below the discharge chute. This slows down the daily production of the plant. Even if the driver passes under the discharge end of the mixer in a forward direction, production of the plant may be slowed if the driver takes time to clean the front end of the truck following loading, but before departing from the plant.

Figure 7:
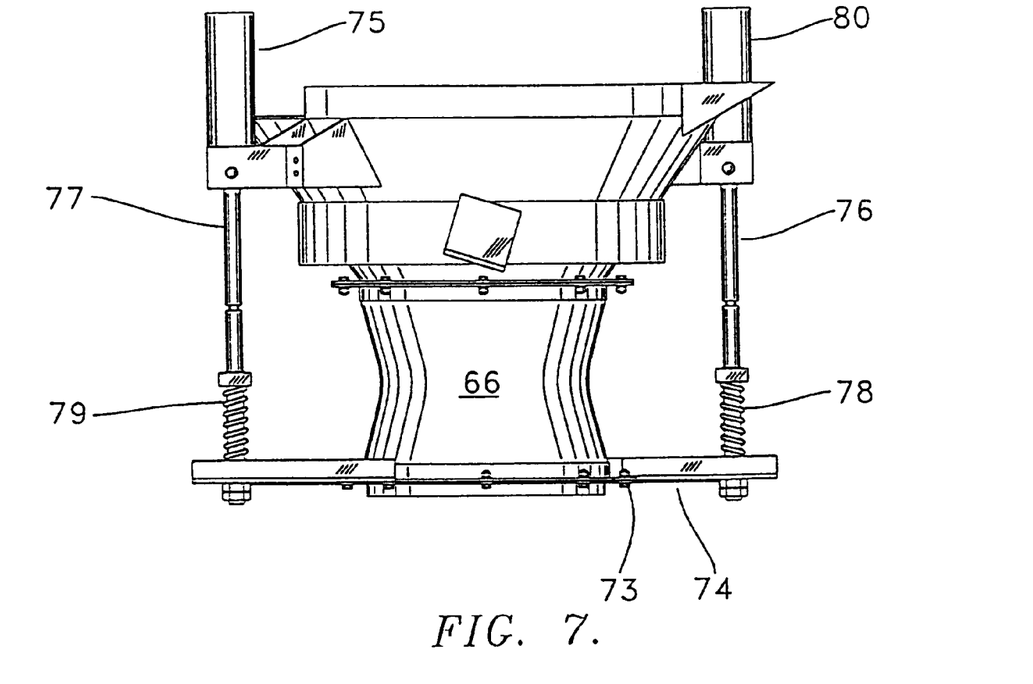
FIG. 7 is the attachment of FIG. 6 in the extended or discharge position.

The attachment of FIG. 6 eliminates this problem by providing a dripless discharge. Truck load hopper 43 has at its lower end a gum rubber sleeve 66 connecting hopper 43 and the truck (not shown). Sleeve 66 is attached at its upper end to hopper 43 by retaining ring 67. Ring 67 is conveniently mated to a corresponding ring 68 on hopper 43 by bolts 69. Similarly, on the bottom end of sleeve 66 a retaining ring 71 holds sleeve 66 to a corresponding ring 72 as by bolts 73. Ring 72 is affixed to landing plate 74 adapted to move up or down between a retracted position, shown in FIG. 6, and an extended position as shown in FIG. 7.

Landing plate 74 rests immediately adjacent to the opening of the mixing drum of the truck (not shown) by at least two arms 76 and 77. Arms 76 and 77 are pistons extending into air cylinders 75 and 80. The computer (not shown) signals the air cylinders to raise or lower arms 76 and 77 at the end and beginning, respectively, of the discharge cycle, so that landing plate rests against the truck during discharge to avoid spray of solids or liquids, as well as to control dust. Springs 78 and 79 at the lower ends of arms 77 and 76 serve to keep landing plate 74 against the truck during discharge. Springs 78 and 79 serve to urge landing plate 74 downwardly so that it maintains contact with the truck as it settles under the weight of the load being discharged into the truck. After the discharge cycle is complete, arms 76 and 77 rise into air cylinders 80 and 75 upon signal from the computer, causing the sleeve 66 to deform into the retracted or stowed position shown in FIG. 6. When concrete is being discharged into the truck, the computer causes air cylinders 75 and 80 to extend arms 77 and 76, respectively, so that sleeve 66 extends to the position shown in FIG. 7. When all of the mixed concrete is discharged into the truck, arms 77 and 76 return to cylinders 75 and 80 so that sleeve 66 is in the retracted position of FIG. 6.

The dripless feature is the result of annular trough 81 formed when sleeve 66 is in the retracted position. Any concrete or water adhered to the sides of hopper 43 that slides downwardly by gravity with the passage of time between discharge cycles is caught in trough 81, and does not flow out of the discharge orifice until the next discharge cycle when trough 81 disappears with the extension of sleeve 66 into the FIG. 7 position. While gum rubber is the preferred material for sleeve 66, other suitable elastomers may be used.

Figure 8:
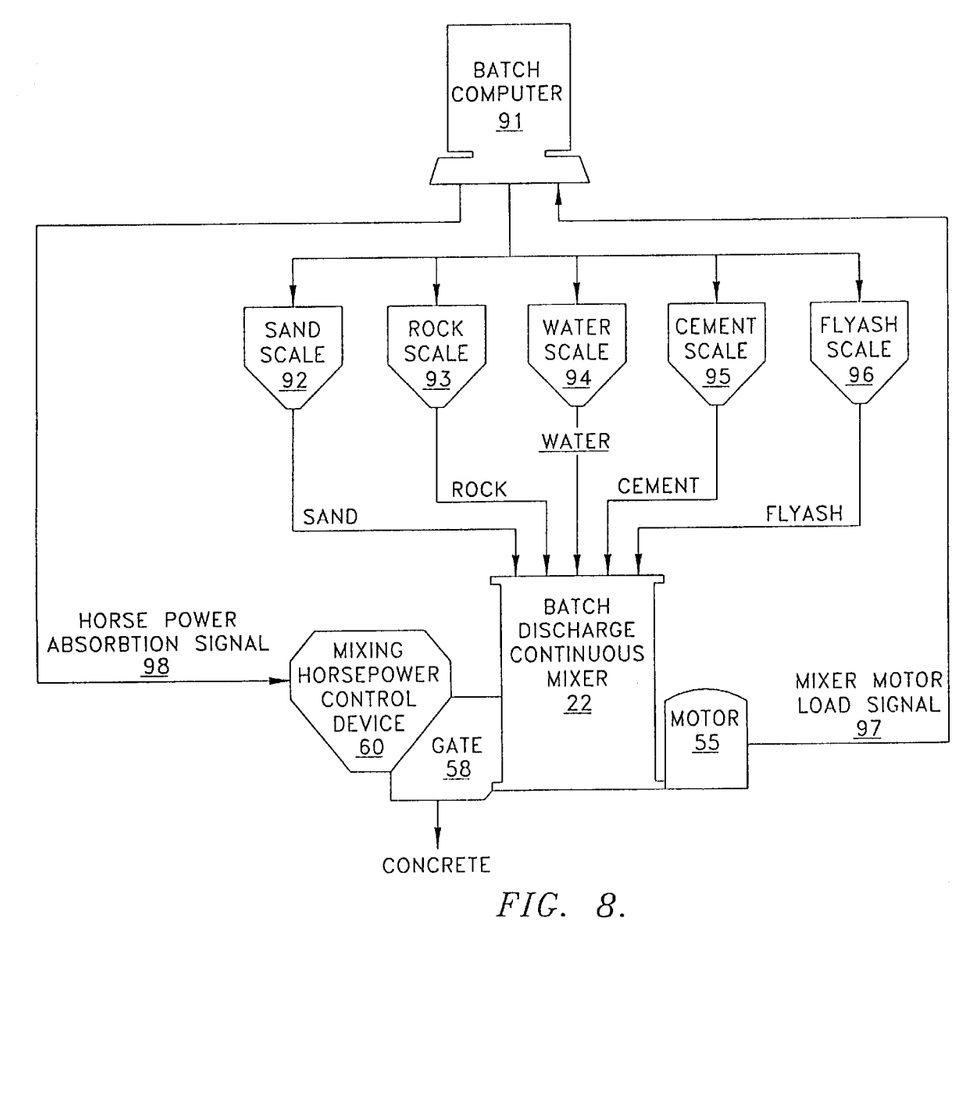
FIG. 8 is a block diagram showing the operation of a plant according to the present invention.

The method of the present invention is illustrated by the block diagram of FIG. 8. The relatively low energy mixing is obtained by separately weighing all ingredients to precisely determine the desired mix, and only mixing the ingredients that are difficult to mix thoroughly apart from those ingredients that are easy to mix. For example, aggregate is usually easy to mix with other concrete ingredients because of its large size. By leaving the aggregate for the last mixing, the other ingredients can be thoroughly mixed before joining the aggregate at the discharge of the premixer before entry into the truck. The rotating drum of the truck is readily able to mix grout and aggregate if the grout has been fully mixed. By not having the large mass of the rock, much less horsepower is needed to mix the other ingredients.

The duration of mixing can be much faster under the present invention because less material is mixed. The mixing time is less than 30 seconds, and preferably between 15 and 20 seconds. While the greatest benefit comes from mixing water, cement, fly ash and sand separately, and then mixing the grout with the aggregate, other combinations are possible, such as dry mixing sand, cement and fly ash before adding the water and aggregate. Likewise, good results may be obtained by including aggregate, particularly small sized rock, with the premix, so long as the ingredients are separately weighed and mixed at the optimum times.

In FIG. 8, a general purpose computer 91 may be programmed to weigh out the desired amount of sand dropped from a hopper (not shown) onto a sand scale 92. Similarly rock is weighed on scale 93, water is weighed on scale 94, cement is weighed on scale 95 and fly ash is weighed on scale 96. Of course, if fly ash will never be needed in the mix, the scale 96 and associated transport means will also not be needed. Other metering means may be used, such as volumetric measures for water, but we have found weight by a scale is the most convenient.

In the preferred embodiment, precisely measured sand, water, cement and fly ash are discharged by conveyors or gravity (FIG. 1) into mixer 22 (FIG. 8). The mixer 22 is driven at a constant rate by motor 55 to achieve mixing during a dwell time of 15 seconds in the mixer. To assure sufficient horsepower absorption in the mixer 22, computer 91 senses the load on the motor 55 by means of signal 97. If the load on motor 55 indicates the mixing is incomplete, the computer sends a horsepower absorption signal 98 to air cylinder 60 that controls gate 58 on the discharge side of the mixer 22. To increase the horsepower absorption, signal 98 closes the gate sufficiently to increase the load on motor 55 to increase the intensity of energy on the mix. If the horsepower absorption is too great, the motor load signal 97 causes the computer to signal lower power absorption by opening gate 58 by reversing air cylinder 60.

Rock weighed on scale 93 may be discharged into mixer 22, but preferably is conveyed to hopper 43 (FIG. 1) to enter the truck along with the grout exiting mixer 22. Rock and grout would then be mixed in the truck on the way to the jobsite.

By not mixing gravel in the batch discharge mixer, the power requirements and capacity of the plant are markedly improved. Depending upon the plant capacity that is desired, mixing motors between 75 horsepower and 150 horsepower will serve most needs. The improvement in plant production is best illustrated by examining the ratio of plant production, measured in cubic yards per hour, to the horsepower of the mixer motor. All prior art plants that have been studied have a ratio of cubic yards per hour to horsepower that is less than two. That means that the production capacity is less than twice the horsepower of the mixing motors. In contrast, using motors that are 75 HP, 100 HP, 125 HP and 150 HP in the mixer of the present invention, the plant production is more than twice the horsepower of the motor. Thus, the power is more efficiently utilized in the batch discharge mixer of the present invention.

Figure 9:
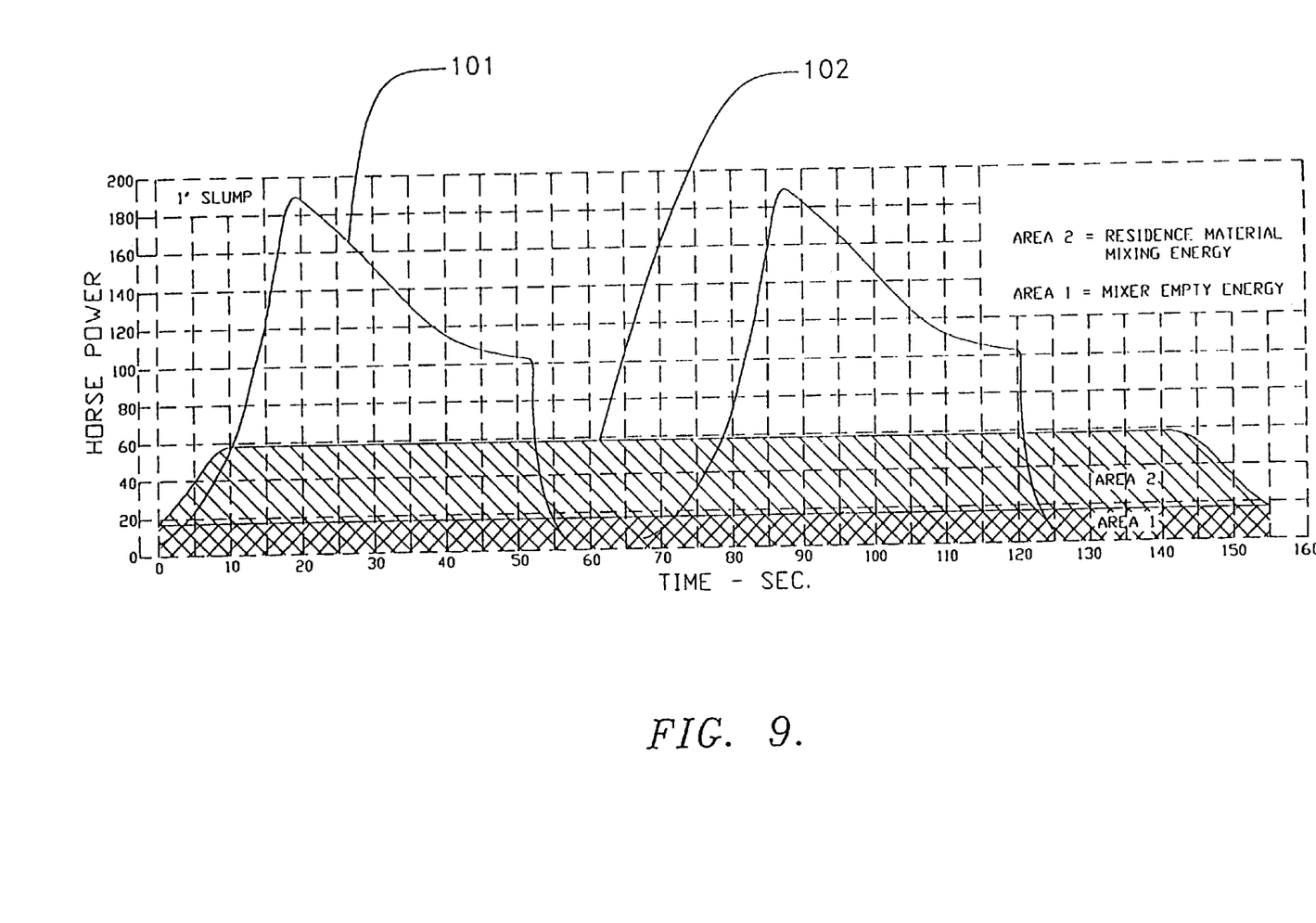
FIG. 9 is a chart comparing the power consumption of the mixer of the present invention with that of a conventional wet mix plant.

FIG. 9 is a graph showing the relative power consumption of a plant according to the present invention and a plant using a high intensity mixer of the type known to the trade as Nikko spiral flow, twin shaft concrete mixing system. The prior art system uses two 100 horsepower motors to act on a six cubic yard mixer. As shown in FIG. 9, horsepower is plotted against time for the prior art mixer 101, and for the mixer of the present invention 102. For the comparison, a low slump, high strength concrete mixture was prepared for each device. A twelve yard batch of one inch slump was selected as typical for the purpose.

Because the capacity of the Nikko mixer is only six cubic yards, two consecutive charges were necessary, with the power consumption shown in line 101. Rock, sand. cement, fly ash and water were charged between time 0 and time 18, causing the power to reach a peak of 190 HP at time 18. Mixing continued for about 35 seconds, until about time 53, during which power consumption declined as a result of mixing. At time 53, the drum was discharged in preparation for the next charge. The discharge gate opens at time 57, giving a five second discharge time. The motors resumed at time 67 to allow the second charge to be mixed, again reaching peak power if 190 HP at about time 88, followed by continued mixing until time 121, at which time the second charge was discharged. Four or five seconds were allotted for discharge, concluding the 12 yard cycle at time 125.

The problem with the prior art mixer and a high strength concrete is that the stiffer mix cannot flow into the truck in the time allotted. There is a bridging effect that makes the truck appear full when it is not, and the load cannot be discharged in 5 seconds without a large holding hopper. The cycle has to be interrupted to permit the low slump concrete to be discharged over a longer period, thus reducing plant capacity. Further, the tremendous power consumption of the prior art mixer is shown by line 101 of FIG. 9.

In contrast, line 102 shows a power build up by a single 100 horsepower motor over a period of 15 seconds to 60 HP. 15 seconds is the dwell time in the present method, so the initial charge to the mixer at time 0 is mixed and exiting at time 15. The grout is continuously mixed and discharged from time 15 to time 140, at which time the last of the twelve yards enters the mixer and is discharged under lowering power at time 155.

It will be seen that the power consumption is dramatically less than with the prior art system, and the steady, continuous mixing allows discharge without bridging and accompanying slowdown. Mixing is more uniform, so strength is higher. The relatively small size of the batch discharge mixer allows it to be easily shipped, and it takes less space at the plant than full size batch mixers. The smaller size, together with the absence of abrasive gravel, allows long life coatings and wear surfaces that would be prohibitive in a conventional batch size mixer. Ready mix plants are typically washed out several times a day and the water is settled and recycled. The efficient mixer of this invention allows washout with less water and less time.

What is claimed is:

1. An apparatus for making concrete, comprising:
   one or more measurement devices that are used to provide controlled quantities of at least cement and sand;
   a batch discharge mixer, said mixer receives the controlled quantities of the cement and sand, mixes the controlled quantities of the cement and sand to produce grout, and outputs a flow of grout, said mixer including a mixing container including a rotatable mixing head disposed therein for rotation about a vertical axis, said mixing head mounted to a shaft coupled to a motor, the mixing head having a plurality of short blades mounted on the periphery thereof, said mixing head having a cap for directing materials to the blades; and
   a controller coupled to said measurement devices and said mixer, said controller monitors and controls mixing energy applied by said mixer and absorbed by the grout during mixing,
   wherein said mixer further includes a discharge gate, and said controller operates to control the mixing energy by controlling the degree of opening of the discharge gate.

2. An apparatus as recited in claim 1, wherein said mixer does not also mix course aggregate with the cement and sand.

3. An apparatus as recited in claim 1, wherein said mixer has a capacity less than a batch size of a batch of concrete being produced.

4. An apparatus as recited in claim 3, wherein the flow of the grout from said mixer is continuous for the batch once the flow of the grout begins.

5. An apparatus as recited in claim 3, wherein said blades are hardened steel blades and said mixing container includes a ceramic lining.

6. An apparatus as recited in claim 5,
   wherein said mixing container further includes a lower deck region positioned proximate to said discharge gate, said lower deck region having a smooth, non-stick surface that facilitates discharge of the grout from said mixer.

7. An apparatus as recited in claim 1,
   wherein said mixer discharges the grout with a substantially constant rate (volume/second), and
   wherein as said controller increases the mixing energy, the velocity at which the grout is discharged from said mixer increases.

8. An apparatus as recited in claim 1,
   wherein said one or more measurement devices also provides a controlled quantity of water to said mixer, and
   wherein said mixer receives the controlled quantities of the cement, sand and water, and mixes the controlled quantities of the cement, sand and water to produce the grout.

9. An apparatus as recited in claim 8,
wherein in monitoring and controlling the mixing energy said controller operates to monitor a load on the motor and control the mixing energy based on the load.

10. An apparatus as recited in claim 8, wherein said mixer does not also mix gravel with the cement and sand.

11. An apparatus as recited in claim 1, wherein said mixer forcibly discharges the grout from said mixer.

12. An apparatus as recited in claim 1, wherein said mixer provides a continuous, flow-through mixing action in which the controlled quantities are fed into said mixer while the grout is discharged from said mixer.

13. An apparatus as recited in claim 1, wherein the capacity of said mixer is less than ¾ cubic yard.

14. An apparatus as recited in claim 1, wherein the mixing time is less than 30 seconds.

15. An apparatus as recited in claim 1, wherein the grout is continuously mixed and discharged when said apparatus is making concrete.

16. An apparatus as recited in claim 1, wherein the number of yards of concrete produced by said apparatus in a continuous batch is greater than the capacity of the mixer.

17. An apparatus for making concrete from separate sources of water, cement, sand and gravel, said apparatus comprising:
   one or more measurement devices that are used to provide controlled quantities of at least cement and sand;
   a high intensity, low power mixer for pre mixing sand and cement into an initial mixture without mixing gravel into the initial mixture, said mixer including a motor, a mixing drum and a variable discharge gate at an outlet of said mixer, said mixing drum including a rotatable mixing head disposed therein for rotation about a vertical axis, said mixing head mounted to a shaft coupled to the motor, the mixing head having a plurality of short blades mounted on the periphery thereof, said mixing head having a cap for directing materials to the blades; and
   a controller coupled to said measurement devices and said mixer, said controller monitors a load signal on said motor and controls the load of said motor by adjusting an opening amount provided by the variable discharge gate responsive to the load signal.

18. An apparatus as recited in claim 17, wherein said apparatus is used in a plant,
   wherein said mixer has a capacity less than a batch size produced, and
   wherein a ratio of plant capacity in cubic yards per hour to the horsepower of the motor is at least two.

19. An apparatus as recited in claim 17, wherein the strength of the concrete being made is controlled by said controller operating to control the mixing energy supplied by said mixer and absorbed by the grout.

20. An apparatus as recited in claim 19, wherein the concrete being made is uniformly high strength concrete.

21. An apparatus as recited in claim 17, wherein the horsepower of the motor is between 70–150 horsepower.

* * * * *

UNITED STATES PATENT AND TRADEMARK OFFICE
CERTIFICATE OF CORRECTION

PATENT NO. : 6,126,307
DATED : October 3, 2000
INVENTOR(S) : Melvin L. Black; Todd W. Black It is certified that error appears in the above-identified patent and that said Letters Patent is hereby corrected as shown below:

Column 9,
Line 17, "wherein thc grout" should be -- wherein the grout --.
Line 28, "pre mixing" should be -- pre-mixing --.

Column 10,
Line 18, "produced" should be -- being produced --.

Signed and Sealed this

Sixth Day of November, 2001

Attest:

*Nicholas P. Godici*

NICHOLAS P. GODICI
*Attesting Officer*     *Acting Director of the United States Patent and Trademark Office*